United States Patent [19]
Kunoff et al.

[11] Patent Number: 5,592,587
[45] Date of Patent: Jan. 7, 1997

[54] SHAPED DIGITAL NOISE SIGNAL GENERATOR AND METHOD

[75] Inventors: Noah Kunoff, Old Bethpage; William Van Deusen, East Northport; Craig Consiglio, Mannorville, all of N.Y.

[73] Assignee: AIL Systems, Inc., Subsidiary of Eaton Corp., Deer Park, N.Y.

[21] Appl. No.: 221,745

[22] Filed: Mar. 30, 1994

[51] Int. Cl.$^6$ .................... G10L 5/02; G10L 9/00
[52] U.S. Cl. ............... 395/2.73; 395/2.35; 364/717.5
[58] Field of Search ................. 381/51; 395/2, 395/2.2, 2.38, 2.73, 2.35, 2.36, 2.37; 364/717.5, 717

[56] References Cited

U.S. PATENT DOCUMENTS

| | | | |
|---|---|---|---|
| 4,125,898 | 11/1978 | DeHart et al. | 364/718 |
| 4,327,419 | 4/1982 | Deustsch | 364/717 |
| 4,673,871 | 6/1987 | Brown et al. | 324/76 |
| 4,697,157 | 9/1987 | Buddecke et al. | 331/78 |
| 4,855,944 | 8/1989 | Hart | 364/602 |

OTHER PUBLICATIONS

R. E. Ziemer et al., "Introduction to Digital Communications", Macmillian, 1992, pp. 118–124.

Primary Examiner—Allen R. MacDonald
Assistant Examiner—Patrick N. Edouard
Attorney, Agent, or Firm—Hoffmann & Baron

[57] ABSTRACT

A circuit for generating a digital noise signal characterized by an evenly distributed frequency content for a particular frequency bandwidth of the digital noise signal includes a word signal generator for generating a random sequence of N-bit digital word signals with each cycle of a system clock signal provided to the word signal generator, where N is a non-zero integer. The noise generating circuit further includes a shaping circuit which transforms the random sequence into a shaped sequence of N-bit digital word signals, and a frequency synthesizer which is responsive to the shaped sequence and which generates the digital noise signal.

17 Claims, 10 Drawing Sheets

SHAPED DIGITAL NOISE SIGNAL GENERATOR AND METHOD

BACKGROUND OF THE INVENTION

1. Field of the Invention

This invention relates to a noise generation method and system, and more particularly to a shaped digital noise generation method and system.

2. Description of the Prior Art

Conventionally, digital noise generation is implemented by sampling an analog noise source, such as a noise diode, i.e., sampling white noise. However, digital noise generated by sampling white noise generally results in several undesirable effects. For example, analog noise sources display inconsistent unit-to-unit operation and relatively high failure rates, requiring frequent readjustments. In addition, thermal sensitivity inherent in analog noise sources may affect the consistency of the performance of the noise source rendering the quality of digital noise generated therefrom inconsistent over time.

Conventional digital noise generation also includes a method whereby multiple parallel taps off a single linear feedback shift register are used to develop a sequence of random digital word signals. The sequence of random digital word signals is provided to a frequency modulating synthesizer which translates the sequence to a digital noise signal. The frequency of the digital noise signal vary with each new word signal of the sequence. This approach, however, like the technique that consists of directly sampling white noise, has drawbacks. For example, varying the frequency of a digital noise signal in accordance with a generated sequence of digital word signals may produce an even frequency distribution with an uneven frequency rate distribution within the noise signal generated thereby. More specifically, the frequency rate distribution within the digital noise signal will reflect a gaussian rather than flat character for a particular frequency bandwidth mapped by the generated sequence. Thus, a desirable flat crossing rate distribution will not appear in the noise distribution and the power spectral density of the generated noise signal.

OBJECTS AND SUMMARY OF THE INVENTION

It is therefore an object of the present invention to provide a digital noise generation method and apparatus which avoid the inconsistent unit-to-unit operation prevalent in conventional digital noise generators utilizing analog noise sources.

It is another object of the present invention to provide a digital noise generation method and apparatus which avoid the relative high failure rate and frequent readjustment needs of conventional digital noise generators utilizing analog noise sources.

It is yet another object of the present invention to provide a digital noise generation method and apparatus which provide a noise output signal having a uniform noise distribution and power spectral density over a given frequency range independent of environmental variations.

It is still another object of the present invention to provide a digital noise generation apparatus for generating high quality, evenly distributed digital noise with increased reliability and reduced size and power requirements.

An apparatus of the present invention for generating a digital noise signal, the digital noise signal characterized by a substantially evenly distributed frequency content for substantially the entire frequency bandwidth of the noise signal includes a digital word signal generator for generating a random sequence of N-bit digital word signals, each word signal being generated with each cycle of a system clock signal that is provided to the digital word signal generator. With respect to the N-bit digital word signal, N is a non-zero integer and each N-bit digital word signal represents an equivalent decimal value in a range of possible values from 1 to $(2^N-1)$.

The digital noise signal generator also includes a shaping circuit which transforms the random sequence of digital word signals into a shaped sequence of N-bit digital word signals. A frequency synthesizer is responsive to each digital word signal of the shaped sequence and provides the digital noise signal in response to the digital word signals.

In one embodiment, each N-bit digital word signal of the shaped sequence corresponds to a memory address within a block of memory. Each memory address contains a stored digital word signal that defines one portion of the digital noise signal for one cycle of a system clock signal. The frequency synthesizer is responsive to each stored digital word signal.

In another embodiment of the invention, the shaping circuit may include a subtracter for expanding the range of values that each N-bit digital word signal of the shaped sequence may represent. The range of possible values may be expanded from about $-(2^N-1)$ to about $(2^N-1)$.

A method of the present invention for generating a digital noise signal characterized by an evenly distributed frequency content over a particular frequency bandwidth includes a step of generating a random sequence of N-bit digital word signals within a sequence signal generator, where each N-bit digital word signal is generated with each cycle of a system clock signal. N is a non-zero integer and a range of possible decimal equivalent values representable by each N-bit digital word signal extends from 1 to $(2^N-1)$.

The method includes the step of transforming the random sequence of N-bit digital word signals into a shaped sequence of N-bit digital word signals within a shaping circuit. A frequency synthesizer generates a portion of the digital noise signal in accordance with each digital word signal of the shaped sequence. The frequency of the digital noise signal vary with each cycle of the system clock signal.

In one embodiment, the method may include the step of translating the shaped sequence by retrieving a digital word signal representing a frequency scaling factor, each frequency scaling factor being stored at each of a plurality of memory addresses within a block of memory. Each memory address corresponds to a corresponding digital word signal of the shaped sequence. Each digital word signal representing each frequency scaling factor may be utilized by the frequency synthesizer to generate the digital noise signal.

These and other objects, features and advantages of this invention will become apparent from the following detailed description of illustrative embodiments thereof, which is to be read in conjunction with the accompanying drawings.

DETAILED DESCRIPTION OF THE PREFERRED EMBODIMENTS

Figure 1:
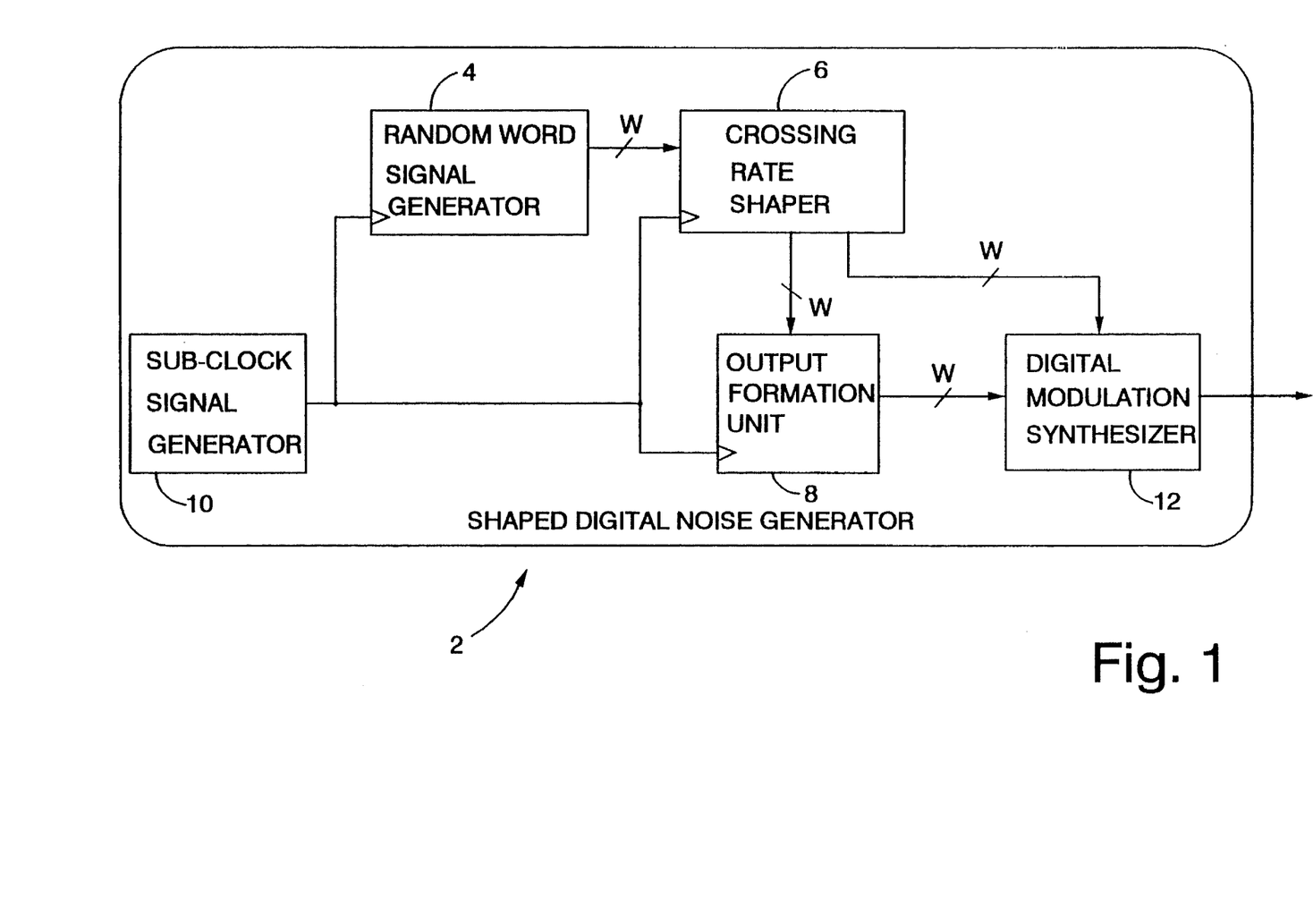
FIG. 1 is a block diagram of a shaped digital noise signal generator of the present invention.

A digital noise signal generator 2 formed in accordance with the present invention is shown in FIG. 1. Digital noise signal generator 2 includes a random word signal generator 4 and a crossing rate shaper 6 to which the random word signal generator is electrically connected. Random word signal generator 4 generates and outputs a sequence $(W_I)_J$ of N-bit digital word signals $W_I$, where N is a non-zero integer defining the number of bits contained in each digital word signal; "I" indicates "input", and "J" represents incremental integer values Each N-bit digital word signal of sequence $(W_I)_J$ is used to define a frequency or frequency rate value of a portion of a digital noise signal output by the digital noise signal generator 2. The crossing rate shaper 6 provides a function by which the sequence of digital word signals $(W_I)_J$ generated within the random word signal generator 4 may be transformed into a second, shaped sequence $(W_O)_J$. The "O" of $W_O$ indicates that the shaped sequence is the "output". The shaped sequence of digital word signals $(W_O)_J$ is the basis of the digital noise signal provided by this invention.

The digital noise signal generator 2 of the present invention also includes a digital modulation signal synthesizer 12. The shaped sequence of digital word signals $(W_O)_J$ that is output from the crossing rate shaper 6 may be directly input into the digital modulation signal synthesizer 12 in which the digital noise signal is generated. Alternatively, the digital noise signal generator 2 of the present invention may include an output formation unit 8 (to be discussed below). The shaped sequence $(W_O)_J$ is further adjusted within the output formation unit 8 prior to its input to the digital modulation signal synthesizer 12.

The shaped sequence of digital word signals $(W_O)_J$ provides for a more uniform frequency crossing rate distribution within the generated digital noise signal as compared to a frequency crossing rate distribution of a digital noise signal generated in response to an unshaped sequence $(W_I)_J$.

Figure 2:
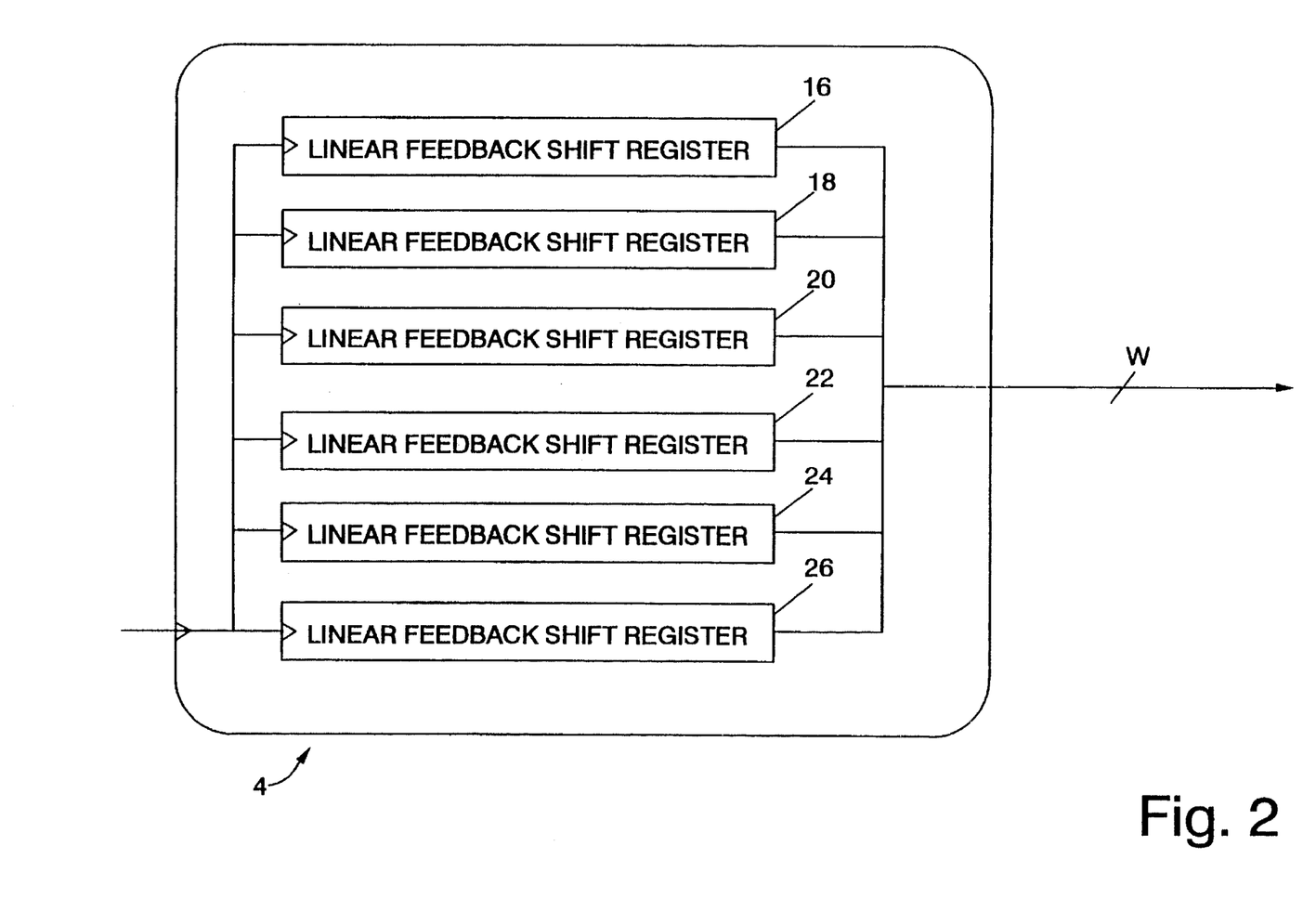
FIG. 2 is a block diagram of a random word signal generator, one element of the shaped digital noise signal generator of the present invention.

A preferred form of the random word signal generator 4 is shown in FIG. 2. The random word signal generator preferably includes six (i.e., N=6) linear feedback shift registers 16, 18, 20, 22, 24, 26. Each linear feedback shift register preferably includes 31 storage units (registers) interconnected to define unique feedback paths resulting in an ability to generate a sequence of $2^{31}$ unique 1-bit output signals. The sequence of 1-bit signals generated by each linear feedback shift register is repeated only after $2^{31}$ cycles of a clock signal applied thereto, i.e., each linear feedback shift register has a repeat periodicity of $2^{31}$ bits. Random word signal generator 4 provides therefore one N-bit word signal $W_I$ of a sequence of digital word signals $(W_I)_J$ with each clock cycle applied thereto. A statistical distribution of the $2^6$ possible values (where N=6) that each word signal $W_I$ may assume is essentially uniform over the common repeat period.

Referring to FIG. 1, the digital noise signal generator 2 of the invention may further include a sub-clock signal generator 10. The sub-clock signal generator 10 is electrically connected to the random word signal generator 4, the crossing rate shaper 6 and the output formation unit 8 to synchronously clock the random word signal generator 4, the crossing rate shaper 6 and the output formation unit 8.

Sub-clock signal generator 10 provides a system clock signal that shifts each N-bit (i.e., six-bit) word signal $W_I$ generated within the random word signal generator 4 into the crossing rate shaper 6. Concurrently, a six-bit digital word signal $W_O$ of a shaped sequence of digital word signals $(W_O)_J$ generated by the crossing rate shaper is shifted out of the crossing rate shaper 6 into the digital modulation signal synthesizer 12. In an embodiment using the output formation unit 8, each word signal output from the crossing rate shaper 6 is shifted into the output formation unit 8 where a subtracting function is performed. Concomitantly, a word signal that is a product of the subtracting is shifted from the output formation unit 8 into the digital modulation signal synthesizer 12.

The sub-clock signal generator 10 preferably also provides options to a user for selecting subdivisions of a master clock contained within the sub-clock signal generator. Varying the selected subdivision varies the frequency of the system clock signal. The time variation of the sequence of digital word signals $(W_I)_J$ output from the random word signal generator 4, i.e., the repeat periodicity, is directly proportional to the frequency of the system clock signal provided by the sub-clock signal generator 10. Table 1 defines a time duration of each sequence of digital word signals $(W_I)_J$ output according to the varying frequency of the clock signal.

TABLE 1

| STAGES OF LFSRs | CODE LENGTH OF EACH SEQUENCE | CLOCK FREQUENCY | TIME DURATION (PERIODICITY) |
|---|---|---|---|
| 31 | 2,147,483,647 | 20 MHZ | 1.8 min |
| 31 | 2,147,483,647 | 10 MHZ | 3.6 min |
| 31 | 2,147,483,647 | 1 MHZ | 35.8 min |
| 31 | 2,147,483,647 | 500 KHZ | 72.0 min |

Figure 10:
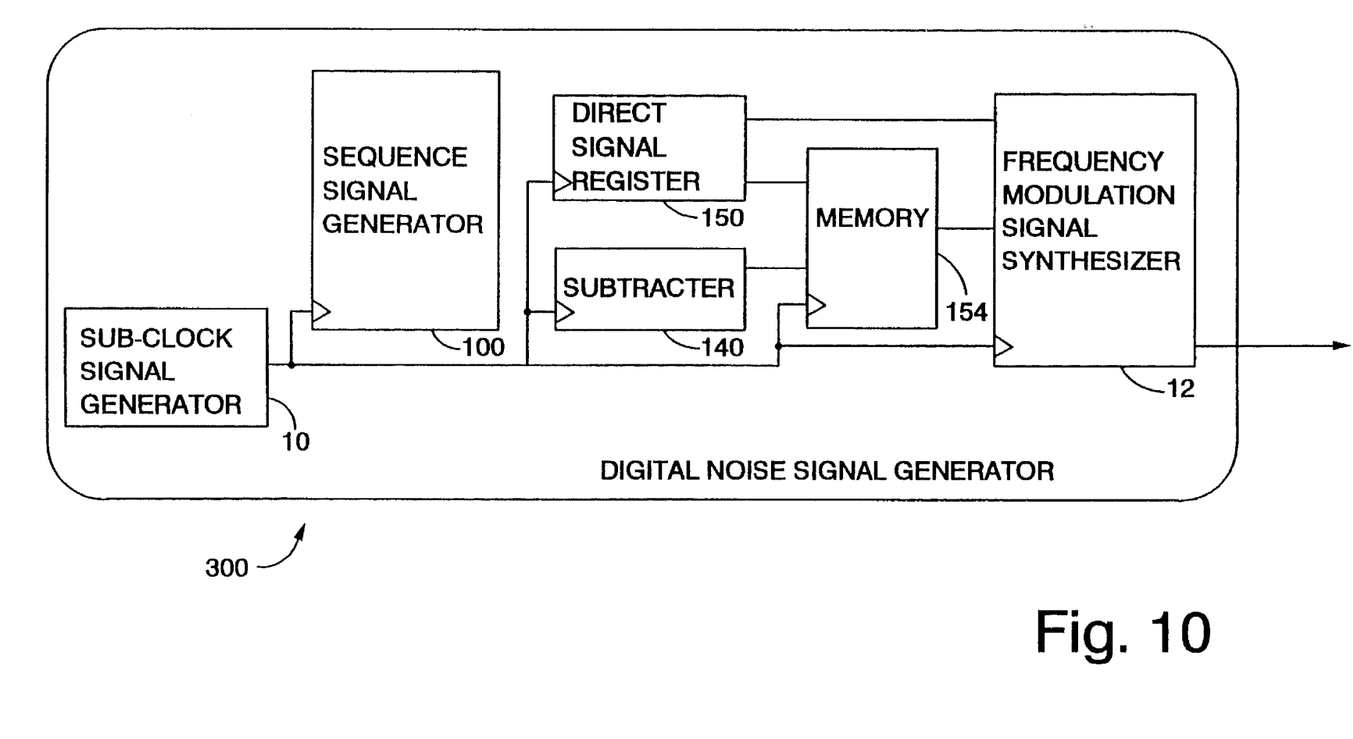
FIG. 10 is a schematic block diagram of yet another embodiment of a shaped digital signal noise generator of the present invention.

In one embodiment, each six-bit digital word signal $W_O$ corresponds to a memory location within a memory block (FIG. 10). The block of memory may reside within the crossing rate shaper 6 or the output formation unit 8, but is not limited to being located at those locations. Each memory location contains a digital word signal that defines a frequency or a frequency rate value for a portion of the digital noise signal. Each one-cycle portion of the digital noise signal is a result of a shifting of the memory-stored digital word signal (corresponding to each N-bit digital word signal $W_o$) into the digital modulation signal synthesizer 12. The frequency and magnitude of the digital noise signal output from the digital modulation signal synthesizer 12 changes from a frequency or a frequency rate defined by a former memory-stored digital word signal at an address corresponding to word signal $(W_O)_{J-1}$ to the frequency or a frequency rate defined by a present memory-stored digital word signal at an address corresponding to word signal $(W_o)_j$.

The frequency of the digital noise signal may be changed in discrete frequency amounts or may be changed substantially continuously. If the frequency values change substantially continuously, all frequency values between the present and former frequencies are crossed or passed through, i.e., a chirp signal is generated. Since all frequency values are crossed, i.e., passed through in either an increasing or decreasing frequency direction as the frequency changes, the frequency rate distribution within a digital noise signal is non-uniform when generated from a random or unshaped sequence $(W_I)_J$ of digital word signals. In other words, because all the frequencies between each frequency value defined by each digital word signal within any sequence are included in the spectrum of the generated noise signal, random word signal generation in a conventional system produces an uneven frequency rate distribution resulting from the over-representation of the crossed middle frequencies.

Figure 3:
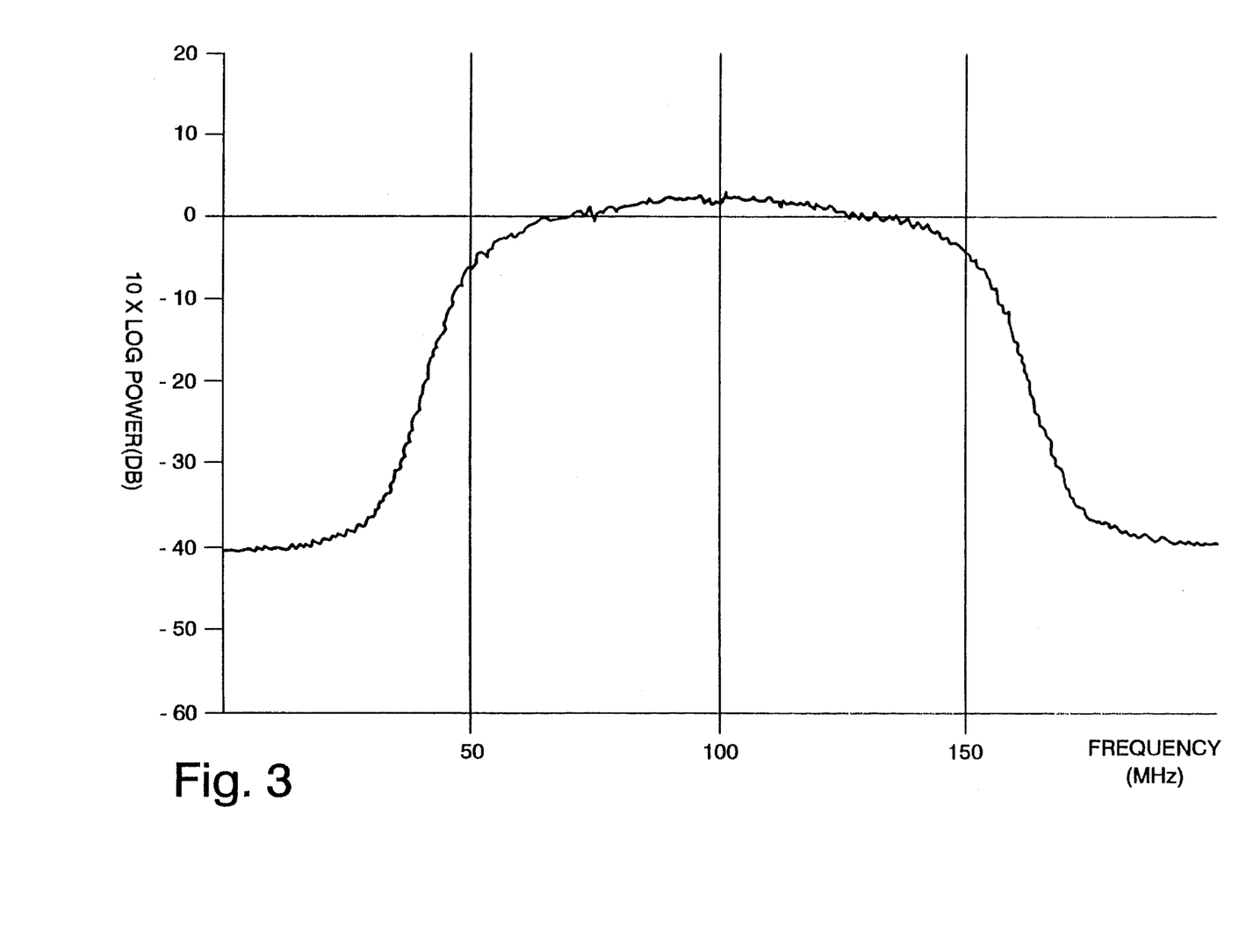
FIG. 3 is a plot of power versus frequency of a digital noise output signal generated using an unshaped sequence of digital word signals provided by the present invention.

FIG. 3 shows a power spectral plot versus frequency of a digital noise signal generated in accordance with an unshaped sequence of six-bit digital word signals $(W_I)_j$. The digital noise signal shown in FIG. 3 has a 100 MHz spot width, or frequency bandwidth, the spot width extending between 50 and 150 MHz. The power level of the generated digital noise signal varies within the 100 MHz spot width approximately 10 dB with varying frequency.

The range of decimal equivalent values spanned by each six-bit digital word signal $W_I$ of an unshaped sequence is from 0 to 63. Each of the 64 (i.e., $2^N$) possible values of each word signal $W_I$ may be thought of as corresponding to one of 64 possible bins. That is, each word of a sequence of digital word signals $(W_I)_J$ designates a corresponding bin or 1/64 of a total space (e.g., in a frequency spectrum) mapped by the 64 bins.

As in the embodiment discussed above, the 64 bins may each map to one of 64 memory locations within a block of memory addressable by the sequence of digital word signals. The 64 memory locations may be contiguous.

More specifically, each sequence of digital word signals, either an unshaped sequence of digital word signals $(W_I)_j$, or a shaped sequence of digital word signals $(W_o)_J$, corresponds to a sequence of bins. The sequence of bins (defined by the sequence of word signals) may represent a frequency value of the digital noise signal or the sequence of bins may represent each address within a block of memory as described above. The breadth of the 64 bin-defined frequency values defines a frequency bandwidth (or noise spot width) for the digital noise output signal. The noise spot width may be varied in size from the above-mentioned 100 MHz value without departing from the scope or spirit of the present invention.

Each new digital word signal ($W_o$ or $W_I$) changes a designated bin (corresponding to a frequency value or an address within a block of memory). The bins lying between a former designated bin, e.g., a digital word signal $(W_O)_{J-1}$ and a presently designated bin, e.g., a digital word signal $(W_O)_J$, must be crossed (as would all the corresponding frequencies or addresses therebetween) with the generation of each new word signal corresponding to each bin, i.e., the middle bins are crossed over. Thus, as each middle bin between a former and present bin is crossed, each frequency value or address corresponding thereto is incorporated within the generated noise signal.

Figure 4:
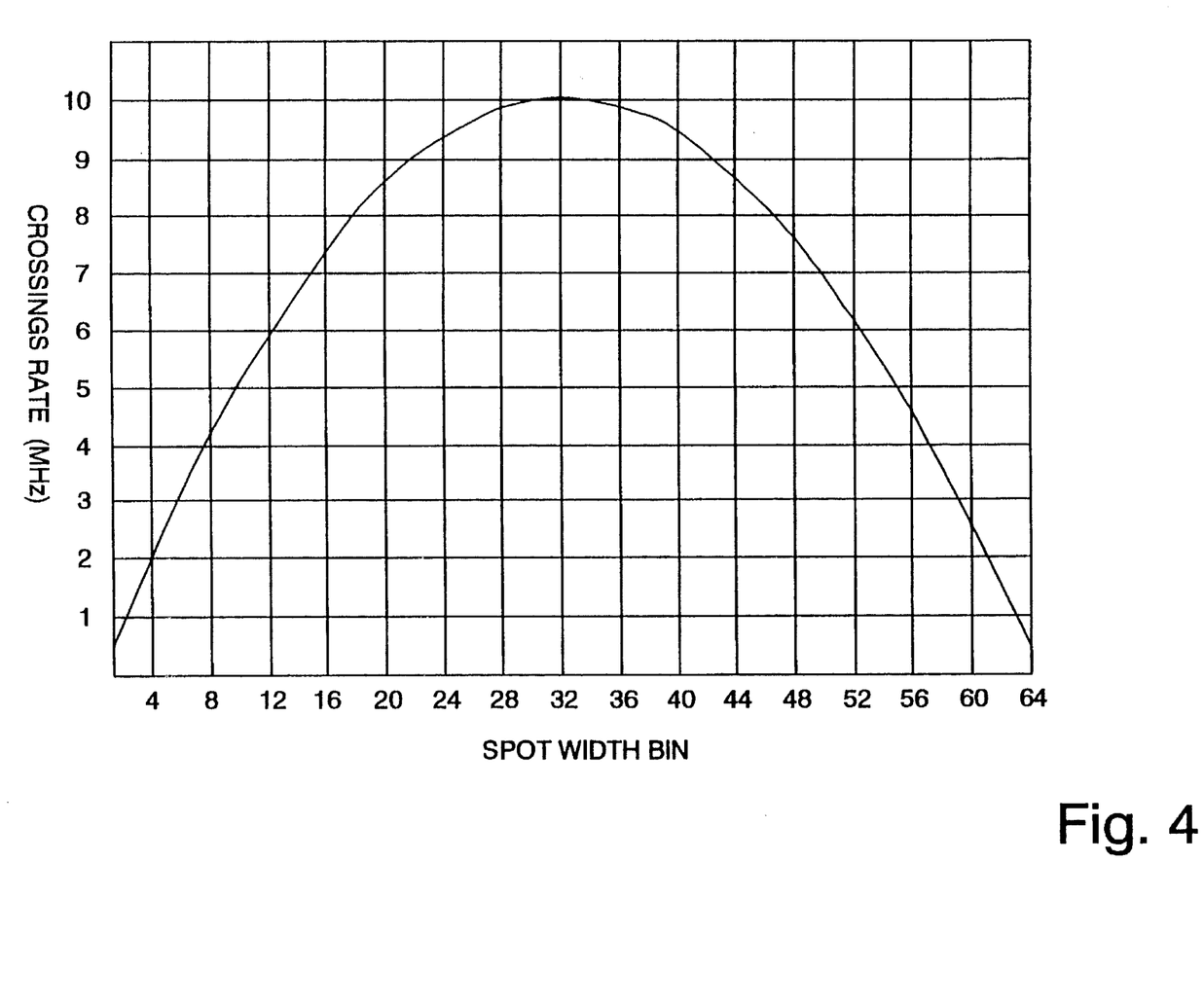
FIG. 4 is a plot of crossing rate versus spot width bin, each bin correlated to a corresponding digital word signal of an unshaped sequence of digital word signals provided by a sequence signal generator.

FIG. 4 is a plot of crossing rate in MHz per bin, where each bin corresponds to each digital word signal of an unshaped sequence $(W_I)_J$ generated by means available in the prior art. The crossing rate that results from the unshaped sequence $(W_I)_J$ may be used by the invention to provide a sequence of frequency values defining a noise signal in which the middle frequency values are represented more frequently than the outer frequency values. The sequence of digital word signals $(W_I)_J$ therefore establishes the basis for a non-uniform frequency rate distribution within the generated noise signal.

In order to avoid the non-uniform frequency rate distribution, the present invention includes the crossing rate shaper 6. The crossing rate shaper 6 is preferably a digital circuit that uniquely transforms (i.e., maps) each digital word signal (corresponding to each bin) of a sequence $(W_I)_J$ received from the random word signal generator 4. The mapping is in accordance with shaping logic (shown in Table 2) contained within the crossing rate shaper. The shaping logic addresses the problem of non-uniformity in the frequency rate distribution that typifies conventional digital noise generated signals.

The generation of an unshaped sequence of digital word signals for use in generating a noise signal corresponding thereto is old in the art. It should be noted, however, that although the digital noise generator of the present invention has its basis in its ability to provide a shaped sequence of digital word signals from an unshaped sequence, the present invention can also provide a noise signal generated according to the unshaped sequence of digital word signals.

Figure 5:
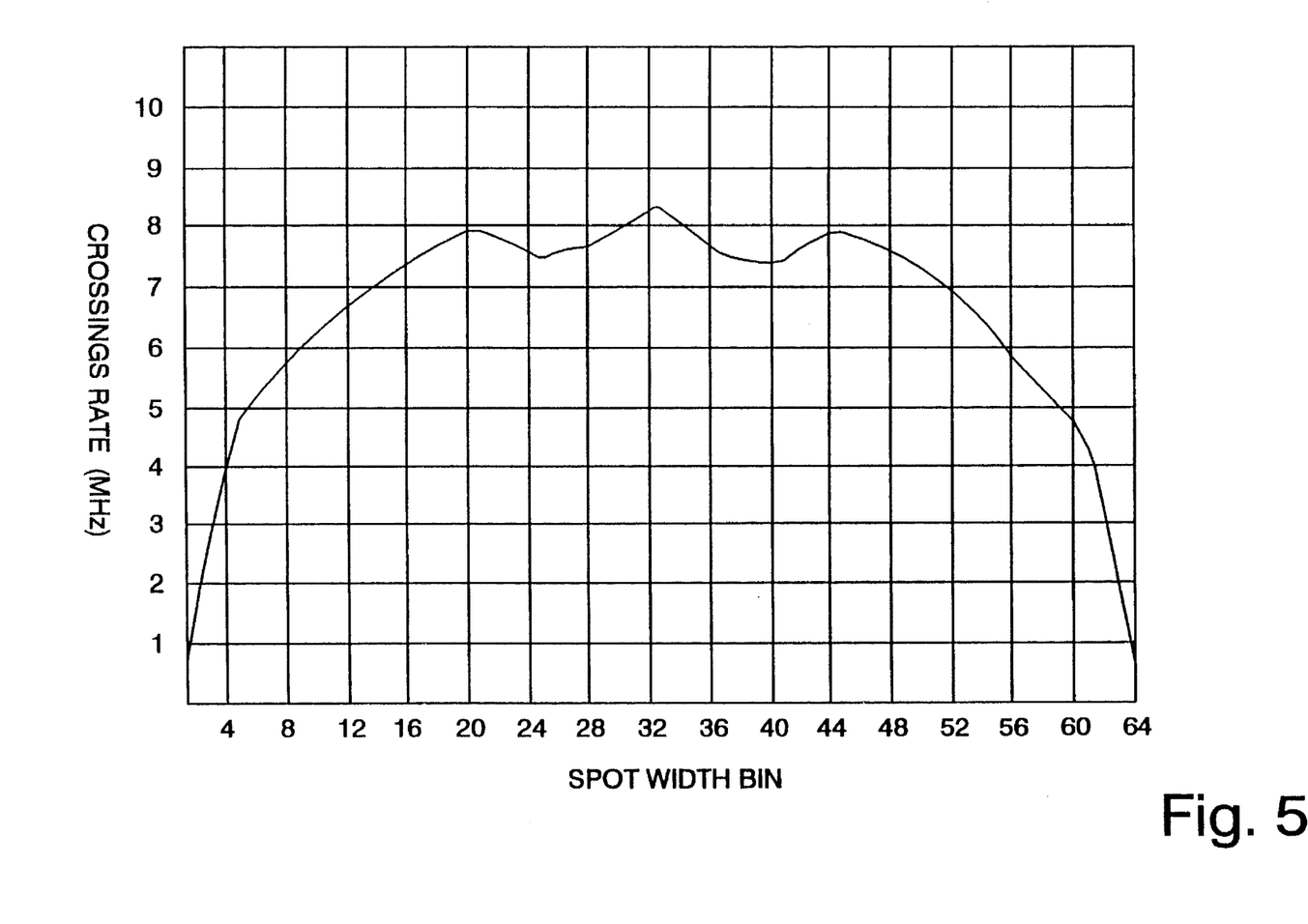
FIG. 5 is a plot of crossing rate versus spot width bin, each bin correlated to a corresponding digital word signal of a shaped sequence of digital word signals provided by a sequence signal generator of the present invention.

FIG. 5 is a plot of crossing rate per bin that is defined by a shaped sequence of digital word signals $(W_O)_J$ provided by the crossing rate shaper 6. The mapping or shaping logic within the crossing rate shaper 6 operates to identify each digital word signal $W_I$ corresponding to the more frequently crossed bins, and minimizes passing through or accessing those bins in favor of bins that are less frequently crossed. The bins that are less frequently crossed are not skipped but are now accessed more frequently by the shaping logic of the crossing rate shaper 6. Accordingly, a more uniformly defined rate at which all bins are crossed is provided as illustrated in FIG. 5 (compare with FIG. 4).

In another embodiment of the invention, the digital modulation signal synthesizer 12 may include a block of addressable memory (not shown). Each digital word signal $W_O$ of sequence $(W_O)_J$ corresponds to one of each of 64 distinct memory locations within the block of memory. A digital word signal stored at each memory location may represent a frequency value, or a frequency rate (slope) value, for some portion of the digital noise signal. Thus, a new digital word signal $W_O$ input to the digital modulation signal synthesizer 12 with each cycle of the clock signal causes a new memory-stored frequency rate or frequency value to be accessed. The memory-stored frequency values (or frequency slope values) are supplied to the frequency modulation signal synthesizer 12 which generates the digital noise signal accordingly. The frequency of the digital noise signal preferably changes substantially linearly with each cycle of the clock signal, but may also change in discrete steps.

TABLE 2

| $(k_i)$ | $W_I$ | | | | | | $W_O$ | | | | | |
|---|---|---|---|---|---|---|---|---|---|---|---|---|
| | $2^5$ | $2^4$ | $2^3$ | $2^2$ | $2^1$ | $2^0$ | $2^5$ | $2^4$ | $2^3$ | $2^2$ | $2^1$ | $2^0$ |
| $k_3$ | 0 | 1 | 0 | 0 | X | X | 0 | 0 | 0 | 0 | X | X |
| $k_2$ | 0 | 1 | 0 | 1 | X | X | 0 | 0 | 0 | 0 | X | X |
| $k_1$ | 0 | 1 | 1 | 0 | X | X | 0 | 1 | 0 | 0 | X | X |
| $k_0$ | 0 | 1 | 1 | 1 | X | X | 1 | 0 | 0 | 1 | X | X |
| $k_0$ | 1 | 0 | 0 | 0 | X | X | 0 | 1 | 1 | 0 | X | X |
| $k_1$ | 1 | 0 | 0 | 1 | X | X | 1 | 0 | 1 | 1 | X | X |
| $k_2$ | 1 | 0 | 1 | 0 | X | X | 1 | 1 | 1 | 1 | X | X |
| $k_3$ | 1 | 0 | 1 | 1 | X | X | 1 | 1 | 1 | 1 | X | X |

Table 2 above illustrates the preferred shaping logic of crossing rate shaper 6. The shaping logic defines a C-bit, e.g., 2-bit, channel in the least significant bit positions of each six-bit word signal $W_I$ input to the crossing rate shaper. An "X" within Table 2 designates a "don't care" state for each particular bit position within the C-bit channel of each N-bit digital word signal $W_I$. C may be any integer value from 0 to N. The two-bit channel defined in Table 2 corresponds to a subspace S which varies in decimal equivalent values from 0 to 3.

The C-defined portion of digital word signal $W_I$, that is, the subspace S, is not affected by the shaping logic of the crossing rate shaper 6. The C least significant bits of digital word signal $W_I$, therefore, vary freely in the shaped digital word signal $W_O$ output. The other (N–C) bits of $W_I$ that are not included within the subspace S, i.e., the 4 most significant bits, are accordingly held constant or forced to change with each word signal input to the crossing rate shaper 6 by its internal shaping logic.

If digital word signal $W_I$ input to crossing rate shaper 6 falls within one of the eight values defined by Table 2, the 4 most significant bits are changed to the 4 most significant bits of the corresponding digital word signal $W_O$. Table 2 entries (i.e., bit values) that are designated by X ("don't care") identify those bits of each digital word signal $W_I$ that are allowed to vary freely, i.e., are provided at the output of the crossing rate shaper 6 exactly as they are input. The four most significant bits of digital word signal $W_I$ designated by each $k_I$ in the table represent constrictive sections or subspaces within the 64 bin range.

The 2 least significant bits of each digital word signal representing each of the 16 bins (i.e., $2^{(6-c)}$ or $2^4$ bins that are defined by the four most significant bit positions of each digital word signal) correlate to a bin range or subspace. The 4 most significant bits of each digital word signal $W_O$ define the bin representing each frequency value. Accordingly, the frequency of the shaped digital noise signal will either change to a value defined by $W_I$ or will be skipped to a frequency value defined by the internal logic of the crossing rate shaper.

At least four different sequences (providing a basis for four distinct variable digital noise signals) are available with the different embodiments of this invention. One of the first possible sequences of digital word signals represents a sequence of six-bit uniformly distributed shaped random numbers. A second possible sequence of digital word signals represents a sequence of six-bit unshaped or random numbers. A third possible sequence of digital word signals represents a sequence of seven-bit (two's complement) successive differences of shaped random numbers and a fourth sequence of digital word signals represents a sequence of seven-bit (two's complement) successive differences of unshaped random numbers.

The biasing rules (as manifest by Table 2) may institute different dwell durations for each constrictive section or subspace. That is, the crossing rate shaper 6 may cause a particular number of consecutive digital word signals $W_O$ to be restricted to one particular subspace. For example, the decimal equivalent values represented by each digital word signal $W_O$ may be forced to vary between 32, 33, 34 and 35 for 512 clock cycles. These different dwell durations are identified by an index $k_i$ extending from 0 to (W-C-1). For example, with W =6 bits and C =2 bits, the index would extend from 0 to 3 defining four channelized constrictive durations of k: $k_0$, $k_1$, $k_2$ and $k_3$. If $k_i$ is held to one, there is a one-to-one correspondence between a value represented by digital word signal $W_I$ that was generated within the random word signal generator 4 and a value represented by digital word signal $W_O$ that was generated within the crossing rate shaper 6.

Thus, in this example, each constrictive section or bin range corresponds to four decimal equivalent values within a number of possible ranges of from 0 to $2^4$ (16 bin ranges), multiplied by $C^2$ ($2^2$). The possible bin values are 0, 4, 8, 12, 16, 20, 24, 28, 32, 36, 40, 44, 48, 52, 56 and 60 and the possible bin range extends 1, 2 or 3 units from the bin values.

The index i for each constrictive section $(k_i)$ identifies which of the 16 constrictive sections or channels defined by Table 2 will be held for a particular dwell duration. For example, Table 2 identifies an index varying from 0 to 3 for the eight possible values of k (corresponding to eight possible channels or 2 bit-defined subspaces) in each half of a mapping space. The mapping space corresponds to the portion of Table 2 in which some portion of the 64 possible bins are represented. For example, with the sixth bit of a digital word signal $W_I$ equal to 0, the upper half of the mapping space of Table 2 is accessed. With the sixth bit of a digital word signal $W_I$ equal to 1, the lower half of the mapping space of Table 2 is accessed. Each constrictive channel or bin range may vary only within the C-defined subspace S, i.e., the least significant bits of the digital word signal.

As previously described with reference to FIG. 1, the signal output from the crossing rate shaper 6 (i.e., digital word signal $(W_O)_j$) may be passed through an output formation unit 8 prior to its transfer to the digital modulation signal synthesizer 12. Output formation unit 8 provides an additional function for shaping the shaped sequence of digital word signals $(W_O)_j$. Each digital word signal $W_O$ input to the output formation unit 8 may be subtracted from a digital word signal $(W_O)$ input with the previous clock cycle (or vice versa). That is, digital word signal $(W_O)_{j+1}$ may be subtracted from digital word signal $(W_O)_j$.

The subtraction provides the output formation unit 8 with the ability to extend or expand the range of the 64 possible decimal equivalent values of each digital word signal $W_O$ input to the digital modulation signal synthesizer 12. For example, the range of the sequence of values may be extended from a span of $2^N$ to a span extending from about $-(2^N-1)$ to about $(2^N-1)$ using output formation unit 8.

Each subtraction result formed by the output formation unit 8 represents a memory location at which is stored a frequency slope value designating a negative or positive linear change in frequency. With each new frequency slope value, the digital modulation signal synthesizer 12 can provide a portion of a digital noise signal in which the frequency changes according to the frequency slope value for the clock cycle. If the frequency slope value is negative, the frequency is preferably decreased at the defined rate for the clock cycle. If a frequency slope value is positive, the frequency preferably increases at the defined rate for the clock cycle.

The output formation unit 8 therefore allows the present invention to provide a portion of a digital noise signal that embodies a positive or negative change in frequency for each clock cycle. The noise generated by such a scheme enjoys a more even frequency crossing rate content.

Figure 6:
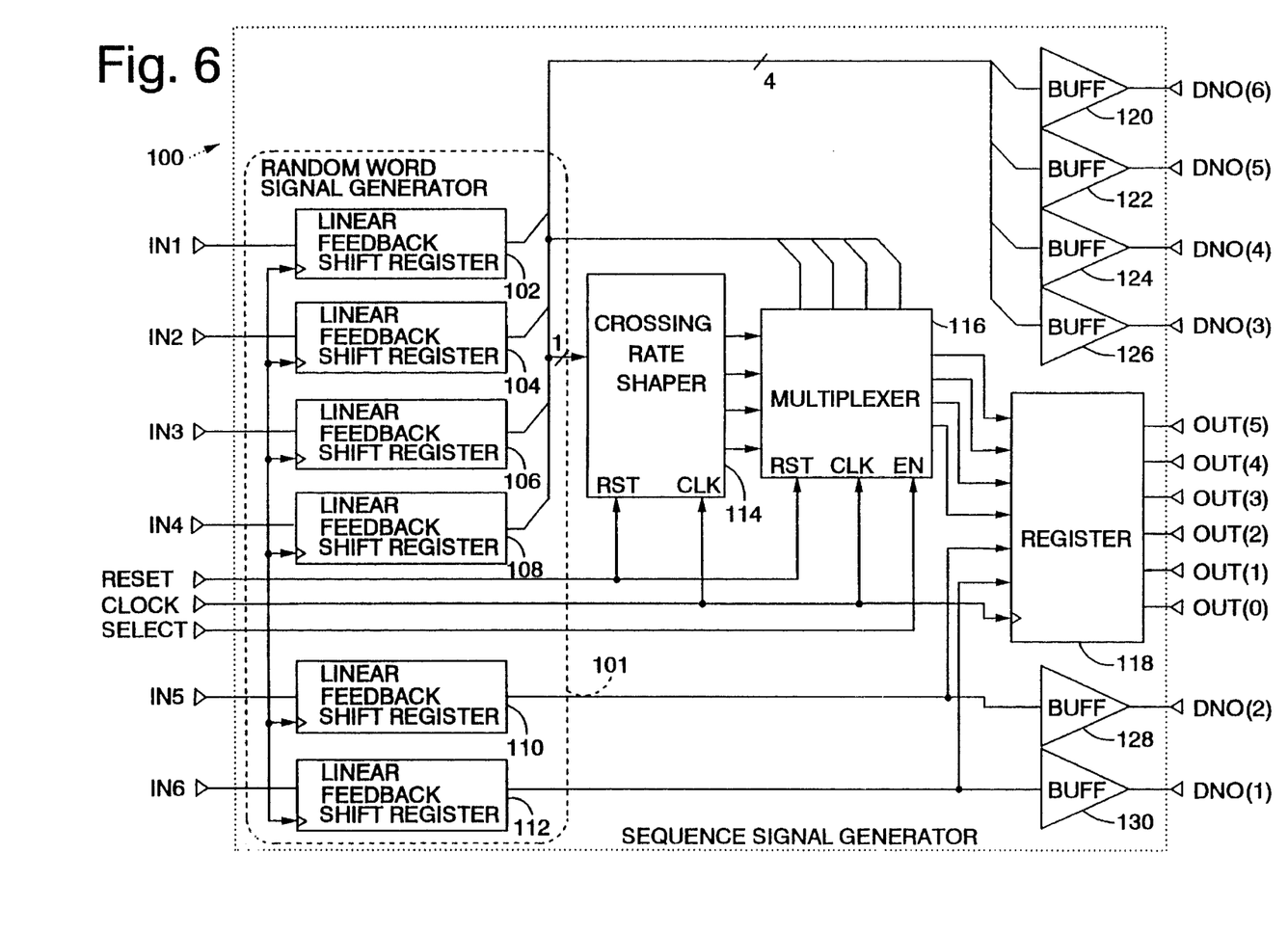
FIG. 6 is a circuit diagram of a sequence signal generator of the present invention.

Referring to FIG. 6, a circuit diagram of a sequence signal generator 100 representing one embodiment of this invention will now be described. The sequence signal generator 100 includes a random word signal generator 101 and a crossing rate shaper 114. The sequence signal generator 100 can provide either a shaped $(W_O)_J$ or unshaped $(W_I)_J$ sequence of digital word signals. The sequence signal generator 100 does not in and of itself generate the digital noise signal, but merely generates shaped or unshaped sequences representative of the digital noise signal.

One form of sequence signal generator 100 is depicted in FIG. 6. The sequence signal generator was developed using a programmable gate array, i.e., a XILINX™ XC3064 132 pin plastic grid array manufactured by Xilinx Corporation of California. The sequence signal generator implemented thereby consists of 2589 gates, with a total measured power consumption of less than 1 watt. The development of the desired noise signal specification using the XILINX™ gate array was accomplished using a clock rate ranging from about 500 KHz to about 20 MHz.

The random word signal generator 101 contained within the sequence signal generator 100 preferably includes six linear feedback shift registers 102, 104, 106, 108, 110, 112. The six linear feedback shift registers generate a sequence of six-bit digital word signals $(W_I)_J$ in accordance with a clock signal provided to the sequence signal generator 100. The crossing rate shaper 114 is electrically connected to the linear feedback shift registers 102, 104, 106 and 108, each of which represents the four most significant bits of each six-bit digital word signal $W_I$ provided by the random word signal generator 101.

Linear feedback shift registers 102, 104, 106, 108 also are electrically connected to a multiplexer 116 (to be discussed in greater detail below) and to buffer amplifiers 120, 122, 124 and 126, respectively. Because of this configuration, the sequence signal generator 100 may output signals having shaped or unshaped (i.e., not passed through crossing rate shaper 114) sequences of digital words $(W_O)_J$. Linear feedback shift registers 110, 112 are also electrically connected to buffer amplifiers 128, 130, respectively.

The mapping function of crossing rate shaper 114 is preferably defined in accordance with Table 2. If the sequence signal generator 100 is set to operate in a shaping mode, the crossing rate shaper 114 mapping function generates the shaped sequence of digital word signals $(W_O)_J$ from input sequence $(W_I)_J$. The result is a sequence of digital word signals that generates a more uniform rate for the crossing of each bin than the crossing rate resulting from the sequence of digital word signals $(W_I)_J$ which bypass the crossing rate shaper 114.

Multiplexer 116 outputs either the shaped or unshaped sequence of digital word signals from the sequence signal generator 100. Reset and select signals generated by logic (not shown) control the output signal of multiplexer 116. The multiplexer is electrically connected to both the linear feedback shift registers 102, 104, 106, 108 and the four most significant bit positions of each six-bit word signal generated within the crossing rate shaper 114.

The register 118 receives the word signals from multiplexer 116 and, in addition, the two least significant bits of digital word signal $W_I$ output from the linear feedback shift registers 110, 112. The two least significant bits represent the unaffected or non-constrictive section of each six-bit digital word signal $W_O$. The two least significant bits remain unchanged whether the sequence signal generator 100 is operating in the shaped or unshaped mode, that is, regardless of whether the multiplexer 116 outputs directly from the random word signal generator 101 or through the crossing rate shaper 114.

Figure 7:
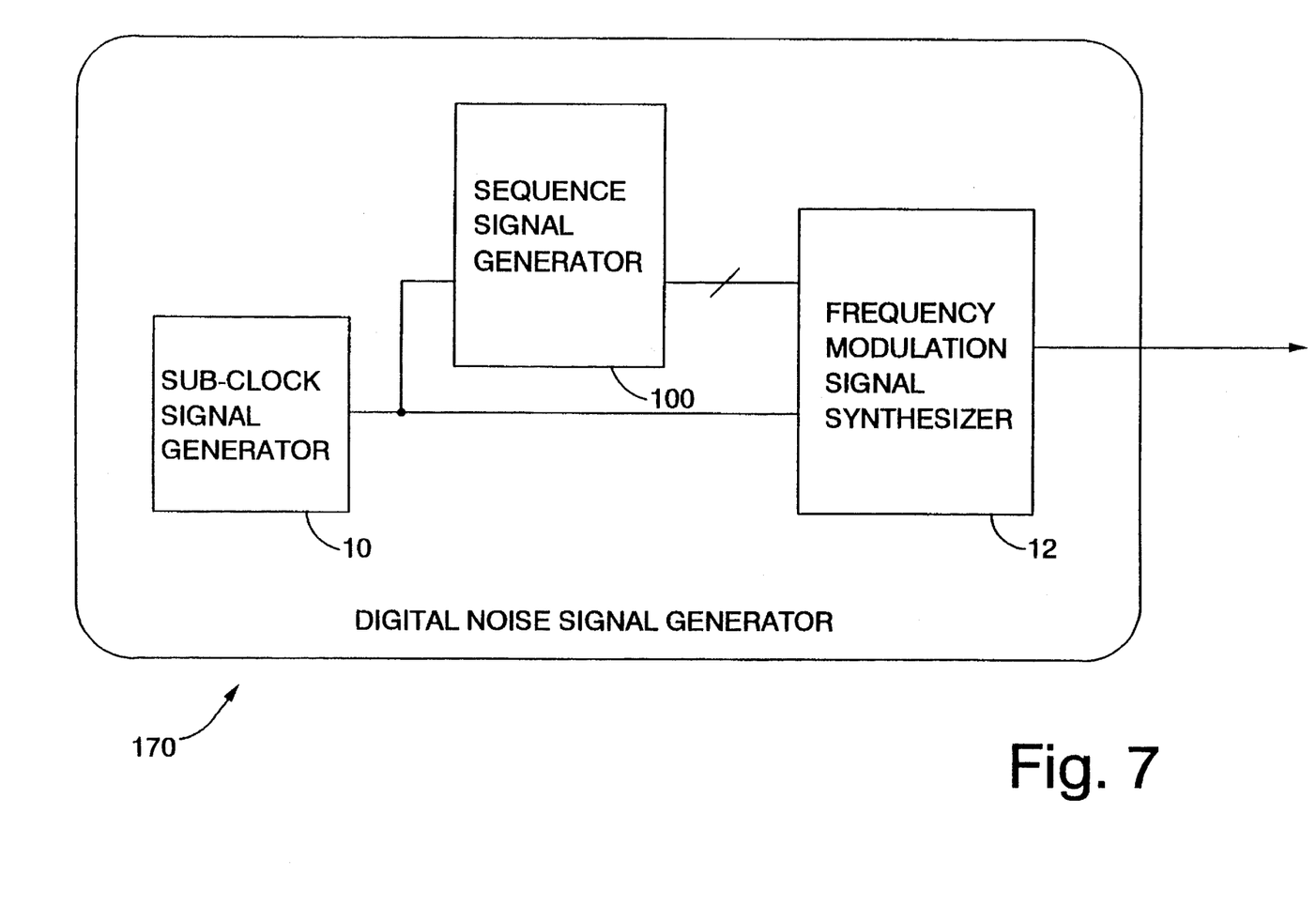
FIG. 7 is a schematic block diagram of one embodiment of a shaped digital noise signal generator of the present invention.

FIG. 7 shows a shaped digital noise signal generator 170 that includes a sequence signal generator 100, a sub-clock signal generator 10 and a frequency modulation signal synthesizer 12. Each digital word signal generated within the sequence signal generator 100 is provided directly to the frequency modulation signal synthesizer 12 in the present embodiment.

The means for actually generating the noise signal is not limited to the frequency modulation signal synthesizer 12 as described herein. Any frequency synthesis means capable of generating a frequency defined noise output signal from a sequence of digital word signals $(W_O)_J$ may be utilized by the present invention.

Figure 8:
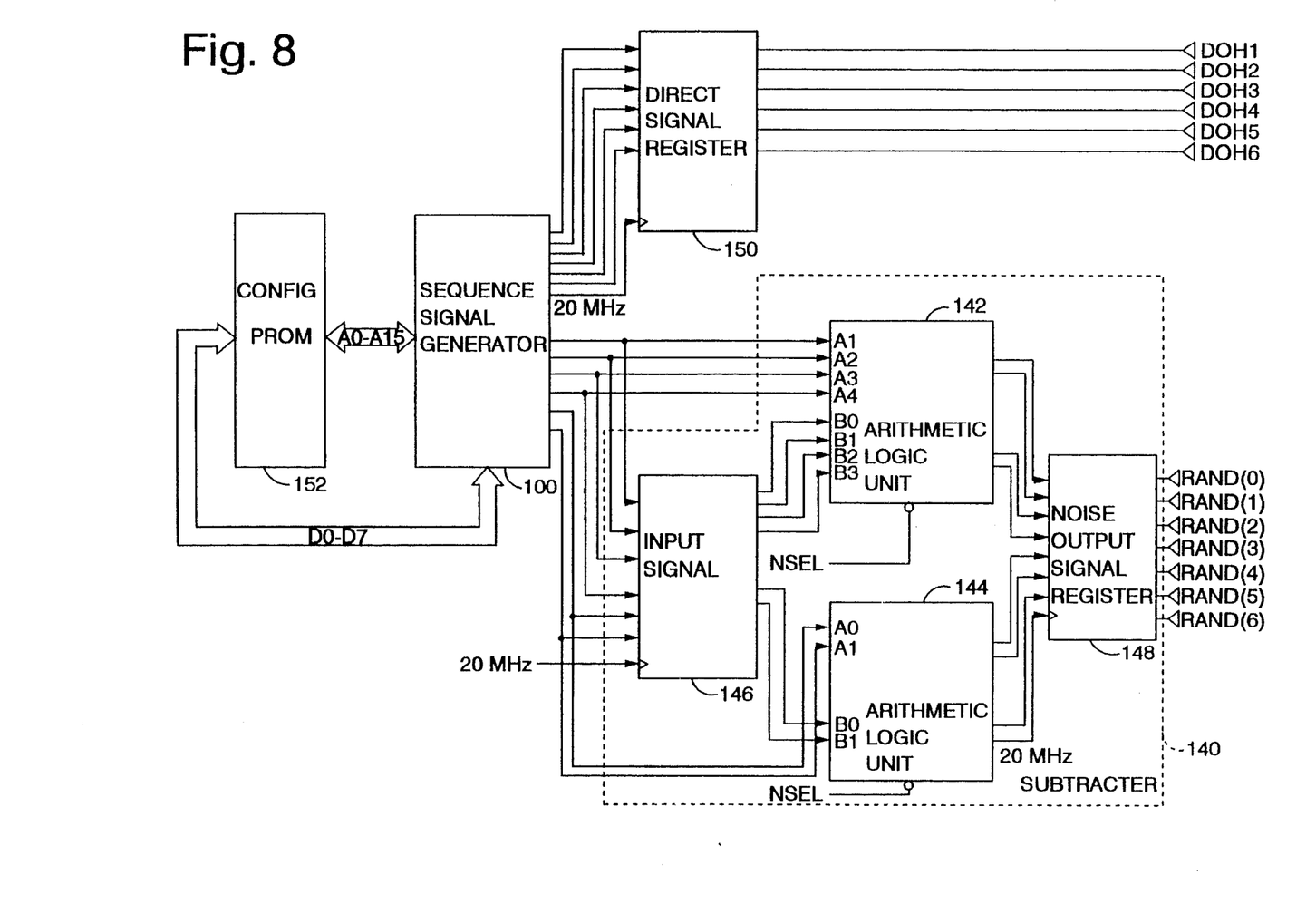
FIG. 8 is a circuit diagram of a sequence signal generator of the present invention combined with a six-bit signal subtracter.

FIG. 8 shows the sequence signal generator 100 of the present invention in combination with a six-bit subtracter 140. The six-bit subtracter 140 allows successive values of digital word signal $W_o$ (within a sequence) to be subtracted from one another (as described above). Each subtraction result represents a memory location at which is stored a seven-bit frequency slope (rate) value. A new subtracter result representing a new seven-bit frequency slope value is generated with each clock cycle. Each one cycle portion of the generated noise signal corresponds to each seven-bit frequency slope value, thereby implementing a change in each slope value (changing frequency) and embodied within the digital noise signal for each clock cycle.

Referring to FIG. 8, sequence signal generator 100 provides the sequence of digital word signals $(W_O)_J$ to both an input signal register 146 of the subtracter 140 and a direct signal register 150. Direct signal register 150 provides that each digital word signal of sequence $(W_O)_J$ is available as input to the frequency modulation synthesizer (12 of FIG. 9) without first being differenced by subtracter 140.

The input signal register 146 of subtracter 140 provides the four most significant bits of each digital word signal $W_O$ to a first arithmetic logic unit 142. The two least significant bits of each digital word signal $W_O$ are provided to a second arithmetic logic unit 144. The subtraction is performed within the two arithmetic logic units, the resulting signal of which being provided to a noise output signal register 148. Noise output signal register 148 reforms each six-bit digital word signal, providing the same as input to frequency modulation signal synthesizer 12 or other means known to those skilled in the art for generating a variable frequency signal.

The arithmetic logic units 142 and 144 allow the range of 64 bins which can be represented by a sequence of six-bit digital word signals to be expanded to 123 bins. For example, subtracting decimal equivalent 63 from decimal equivalent 0 generates a bin with a decimal equivalent value of −63. Noise signals generated from the expanded sequence may contain a more varied spectral content because the range of frequency slope values stored at each memory address is expanded.

Configuration Prom 152 is a programmable read only memory which contains the instructions which, when downloaded into the gate array, convert the gate array into the sequence signal generator 100. The structure of the sequence signal generator 100 may thereby be varied in accordance with a particular application, i.e., by varying the set of instructions provided thereto. The sequence signal generator 100, as above described, is not limited to an implementation within a programmable gate array. The above described sequence signal generator may be implemented by any manner known to those skilled in the art without departing from the scope or spirit of this invention.

Operation of the sequence signal generator 100 combined with the subtracter 140 is as follows. The six linear feedback shift registers 102, 104, 106, 108, 110, 112 generate each digital word of an unshaped sequence of digital word signals $(W_I)_J$. The unshaped sequence of digital word signals displays a crossing rate (i.e., the rate at which frequencies or bins represented by the unshaped sequence are crossed) approximating the crossing rate depicted in FIG. 4. When the select and reset logic of the sequence signal generator are set to provide a shaped sequence, the unshaped sequence of digital word signals $(W_I)_J$ is passed through crossing rate shaper 114 and subtracter 140 thereby providing the shaped sequence.

The signal output from the sequence signal generator 100 is provided to the input signal register 146 of subtracter 140. The input signal register 146 provides the four most significant bits of each digital word signal $W_O$ to the arithmetic logic unit 142, and provides the two least significant bits of digital word signal $W_O$ to the arithmetic logic unit 144. As each subtraction or differencing is performed, the signal register 148 outputs each word signal of a sequence of the 127 possible signal values available by use of the differencing.

The sequence of digital word signals $(W_O)_J$ output from the combination crossing rate shaper 114 and subtracter 140 approaches the crossing rate depicted in FIG. 5. Because each bin (corresponding to each digital word signal of each sequence) is crossed more uniformly, the frequencies (or frequency slope values) represented by the crossed bins are more uniformly represented within the digital noise signal generated thereby.

Figure 9:
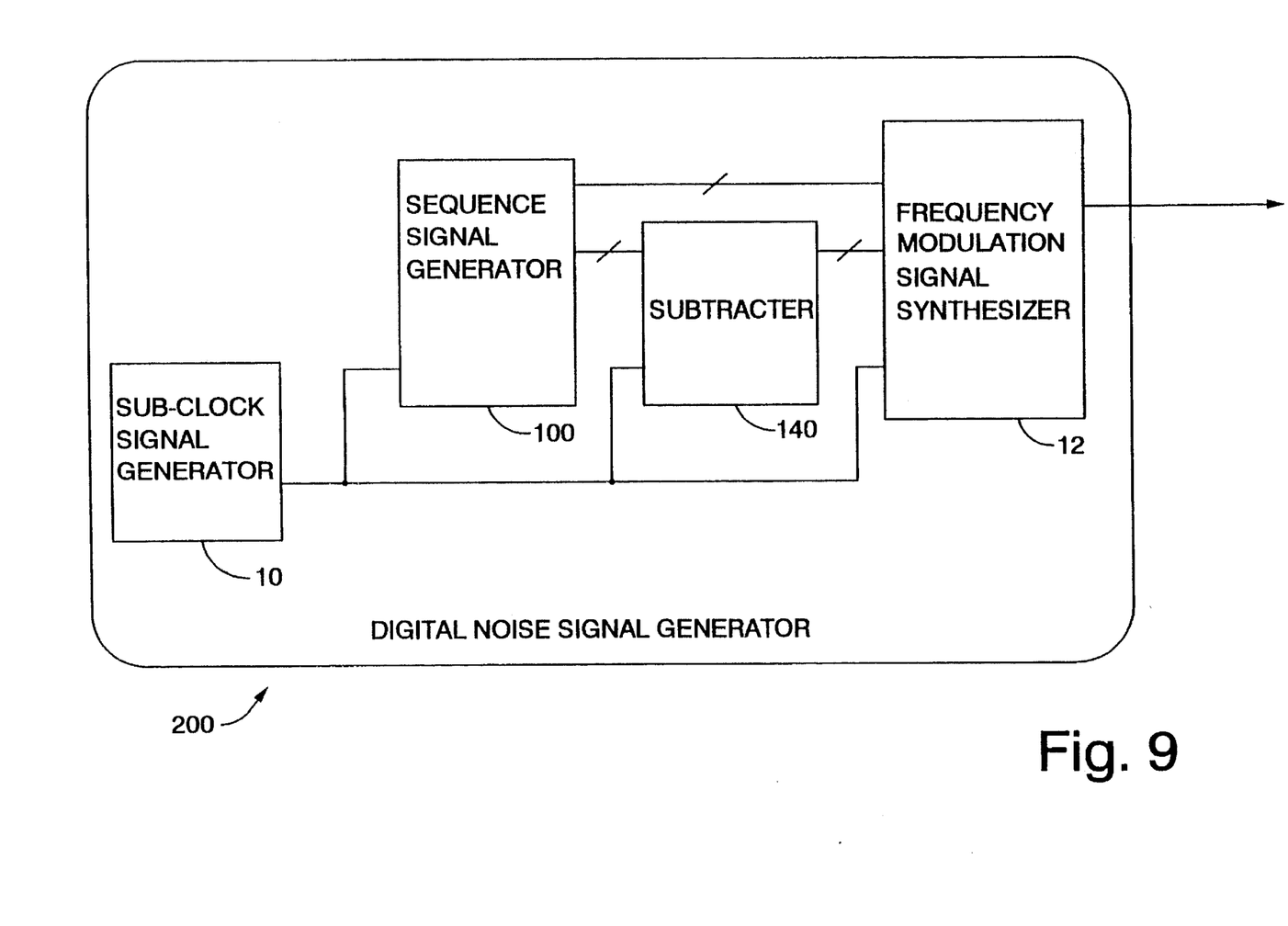
FIG. 9 is a schematic block diagram of another embodiment of a shaped digital signal noise generator of the present invention.

FIG. 9 shows another embodiment of a digital noise signal generator 200 of the present invention. The digital noise signal generator 200 includes a sequence signal generator 100, a sub-clock signal generator 10, a subtracter 140 and a frequency modulation signal synthesizer 12. The sequence signal generator 100 is electrically connected to the subtracter 140. Each of the sequence signal generator 100, the subtracter 140 and the frequency modulation signal synthesizer 12 is electrically connected to the sub-clock signal generator 10.

The sub-clock signal generator 10 provides a clock signal for synchronizing internal data transfer and varying the periodicity of the digital noise signal generated and output by the present invention. The sequence signal generator 100 depicted in FIG. 9 generates and provides either of the above-described shaped or unshaped sequences of digital word signals $(W_O)_J$ or $(W_I)_J$, respectively, either to subtracter 140 or directly to frequency modulator signal synthesizer 12.

FIG. 10 shows yet another embodiment of a digital noise signal generator 300 of the present invention. As shown in FIG. 10, digital noise signal generator 300 includes a sub-clock signal generator 10, a sequence signal generator 100, a direct signal register 150, a subtracter 140, a memory 154 and a frequency modulation signal synthesizer 12.

Sequence signal generator 100 is electrically connected to direct signal register 150 and subtracter 140. Direct signal register 150 and subtracter 140 are each electrically connected to a memory 154.

Memory 154 and the direct signal register 150 are electrically connected to frequency modulation signal synthesizer 12. Each of the above-described elements is electrically connected to, and clocked by, sub-clock signal generator 10.

Operation of shaped digital signal noise generator 300 is similar to that of the embodiment described with reference to FIG. 9, with the inclusion of a memory 154. Memory 154 may be formed from a portion of the programmable gate array, as is known by one skilled in the art, or may be a separate memory board addressed by logic defined in the gate array. The memory may contain at least ($2^N$) contiguous memory addresses in which are stored digital words representing magnitude and frequency values. Digital word signals $W_O$ (or $W_I$) output by direct signal register 150 into memory access the memory-stored frequency or frequency rate values corresponding to each address. The memory-stored values may then be provided to the frequency modulation synthesizer 12. In response to each new frequency or frequency rate value, the frequency or frequency rate of one cycle of the digital noise signal is changed as seen in the digital noise signal provided by the frequency modulation synthesizer.

In the alternative, memory 154 may contain ($2^{N+1}-1$) contiguous memory addresses in which are stored digital words representing positive and negative frequency slope values (as described above). Each digital word of the shaped sequence passed through the subtracter accesses the frequency slope values which are then provided to frequency modulation synthesizer 12. In response to each new frequency slope value, there is a new change in frequency in the noise signal generated for a particular clock cycle.

As can be seen from the preceding description, the method and apparatus provided by the present invention are advantageous in that a digital noise signal having a uniform frequency distribution may be generated. Not only does the improvement in digital noise generation provided by this invention generate a digital noise signal that more closely follows that noise found naturally, i.e., white noise, but also the relative high failure rate and readjustment needs of digital noise sources of the prior art are avoided with the present invention.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for generating a shaped non-random sequence of N-bit digital word signals, where N is a non-zero integer and each digital word signal represents at least one of $2^N$ possible values, comprising the steps of:

generating an unshaped pseudo random sequence of N-bit digital word signals with a random word signal generator; and shaping the pseudo random sequence of N-bit digital word signals with a shaping circuit to provide said shaped non-random sequence of digital word signals, said shaped sequence being capable of producing a digital noise signal characterized by a substantially uniform frequency crossing rate distribution as compared to a digital noise signal generated by said unshaped pseudo random sequence.

2. A sequence signal generator for generating a non-random sequence of N-bit digital word signals, where N is a non-zero integer and each digital word signal represents at least one of $2^N$ possible values, comprising:

an N-bit digital word signal generator for generating an unshaped pseudo random sequence of N-bit digital word signals; and a rate shaper circuit responsive to the unshaped pseudo random sequence of digital word signals, the rate shaper circuit shaping the random sequence of digital word signals to produce a shaped sequence capable of producing a digital noise signal characterized by a substantially uniform frequency crossing rate distribution as compared to a digital noise signal generated by unshaped pseudo random sequence.

3. A method for generating a digital noise signal that is characterized by a substantially uniform frequency crossing rate distribution for a particular frequency bandwidth, the digital noise signal being generated within a shaped digital noise signal generator that includes a sequence signal generator, a shaping circuit and a frequency synthesizer, comprising the steps of:

generating a random sequence of N-bit digital word signals within the sequence signal generator, where N is a non-zero integer and each digital word signal represents at least one of $2^N$ possible values extending from about 0 to about $(2^N-1)$, and where each digital word signal of the random sequence is generated with each cycle of a system clock signal;

transforming the random sequence of digital word signals to a non-random sequence of N-bit digital word signals within the shaping circuit, the non-random sequence of N-bit digital word signals being shaped for generation of the digital noise signal that is characterized by the substantially uniform frequency crossing rate distribution; and generating the digital noise signal in response to the non-random sequence of N-bit digital word signals within the frequency synthesizer.

4. A method as defined by claim 3, wherein the step of transforming includes expanding the range of values exhibited by each N-bit digital word signal of the non-random sequence to a range from $-(2^N-1)$ to $(2^N-1)$.

5. A method as defined by claim 3, wherein the step of generating the random sequence of N-bit digital word signals includes varying the frequency of the system clock signal to define a repeat periodicity of the random sequence of N-bit digital word signals.

6. A method as defined by claim 3, further including the steps of:

translating the non-random sequence of digital word signals to a memory-stored sequence of N-bit digital word signals by retrieving an N-bit digital word signal representing a frequency scaling factor corresponding to each digital word signal of the non-random sequence, wherein each frequency scaling factor is stored at each of a plurality of memory addresses within a block of memory; and processing the memory-stored sequence within the frequency signal synthesizer thereby defining a frequency of the digital noise signal in accordance with each digital word signal of the memory-stored sequence with each cycle of the system clock signal.

7. Apparatus for generating a digital noise signal characterized by a substantially uniform frequency crossing rate distribution for a particular frequency bandwidth of the digital noise signal, comprising:

a word signal generator for generating an unshaped random sequence of N-bit digital word signals, where N is a non-zero integer and each digital word signal represents at least one of $2^N$ possible values;

a shaping circuit for transforming the random sequence of N-bit digital word signals into a shaped sequence of N-bit digital word signals, the shaped sequence of N-bit digital word signals being shaped for generation of the digital noise signal that is characterized by the substantially uniform frequency crossing rate distribution; and a frequency synthesizer responsive to the shaped sequence for generating the digital noise signal.

8. Apparatus as defined by claim 7, wherein each N-bit digital word signal of the shaped sequence defines at least one frequency of the digital noise signal.

9. Apparatus as defined by claim 7, further comprising a system clock for providing a system clock signal to the word signal generator, shaping circuit and frequency synthesizer.

10. Apparatus as defined by claim 9, wherein the system clock includes means for varying the frequency of the system clock signal to define a repeat periodicity of the random sequence of digital word signals generated within the word signal generator.

11. Apparatus as defined by claim 7, wherein a range of possible values that can be represented by each N-bit digital word signal is from about 0 to about $(2^N-1)$.

12. Apparatus as defined by claim 7, further comprising a subtracter for expanding the range of values of each N-bit digital word signal of the shaped sequence from about $-(2^N-1)$ to about $(2^N-1)$.

13. Apparatus as defined by claim 7, further comprising:

a translator for translating the shaped sequence to a translated sequence of digital word signals, where each digital word signal of the translated sequence represents at least one of a magnitude and a frequency value for a portion of the digital noise signal, and wherein each digital word of the translated sequence is stored at a memory address corresponding to each N-bit digital word signal of the shaped sequence; and means for retrieving each digital word signal of the translated sequence and providing the same to the frequency synthesizer to generate the digital noise signal.

14. Apparatus as defined by claim 13, wherein each digital word signal of the translated sequence represents a frequency slope value in one of a positive and negative direction for each cycle of the system clock signal.

15. Apparatus as defined by claim 7, wherein said shaping circuit contains shaping logic to identify those word signals in said unshaped random sequence of N-bit digital word signals which correspond to more frequently crossed bins and to minimize passing through said frequently crossed bins in favor of less frequently crossed bins.

16. Apparatus as defined by claim 15, wherein said shaping logic defines a C-bit channel in the least significant bit positions of said N-bit digital word signals, C being an integer from 0 to N, said C-bit channel being unaffected by said shaping logic, the remaining N-C bits of each N-bit digital word signal being the N-C most significant bits and being available to be operated on by said shaping logic.

17. Apparatus as defined by claim 16, wherein:

N=6;

C=2; and said remaining N–C (=4) bits of each N-bit digital word signal are adjusted by said shaping logic in accordance with the following table:

| UNSHAPED 4 BITS | SHAPED 4 BITS |
|---|---|
| 0100 | 0000 |
| 0101 | 0000 |
| 0110 | 0100 |
| 0111 | 1001 |
| 1000 | 0110 |
| 1001 | 1011 |
| 1010 | 1111 |
| 1011 | 1111 |
| All other values | unchanged. |

* * * * *